US008090847B2

(12) United States Patent
Dopson et al.

(10) Patent No.: US 8,090,847 B2
(45) Date of Patent: Jan. 3, 2012

(54) SESSION BROKER EXTENSIBILITY APPLICATION PROGRAM INTERFACE

(75) Inventors: David T. Dopson, Seattle, WA (US); Rouslan Beletski, Kenmore, WA (US); Sriram Sampath, Redmond, WA (US); Ido Ben-Shachar, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 300 days.

(21) Appl. No.: 12/114,582

(22) Filed: May 2, 2008

(65) Prior Publication Data

US 2009/0276667 A1 Nov. 5, 2009

(51) Int. Cl.
G06F 15/173 (2006.01)

(52) U.S. Cl. .......................... 709/228; 709/229; 709/240

(58) Field of Classification Search .................. 709/227, 709/228, 229, 240
See application file for complete search history.

(56) References Cited

U.S. PATENT DOCUMENTS

| 5,218,697 | A  | * | 6/1993  | Chung .......................... 709/230 |
| 6,067,580 | A  |   | 5/2000  | Aman et al. |
| 6,338,089 | B1 |   | 1/2002  | Quinlan |
| 6,704,778 | B1 | * | 3/2004  | Horman ........................ 709/220 |
| 7,146,417 | B1 |   | 12/2006 | Coile et al. |
| 7,720,211 | B1 | * | 5/2010  | Winner et al. ........... 379/201.12 |
| 2002/0116354 | A1 |   | 8/2002 | Baudu et al. |
| 2002/0116505 | A1 |   | 8/2002 | Higgins et al. |
| 2004/0181578 | A1 |   | 9/2004 | Elms |
| 2006/0085546 | A1 |   | 4/2006 | Abdo et al. |
| 2006/0265720 | A1 |   | 11/2006 | Cai et al. |
| 2007/0130305 | A1 |   | 6/2007 | Piper et al. |
| 2007/0169170 | A1 |   | 7/2007 | Shiran |
| 2007/0180448 | A1 | * | 8/2007 | Low et al. ......................... 718/1 |
| 2007/0192326 | A1 |   | 8/2007 | Angal et al. |
| 2008/0083010 | A1 | * | 4/2008 | Koehler et al. ................... 726/1 |
| 2009/0063667 | A1 | * | 3/2009 | Smith et al. ................... 709/222 |
| 2009/0106830 | A1 | * | 4/2009 | Maher ............................. 726/12 |

OTHER PUBLICATIONS

PCT Search Report and Written Opinion for PCT Application No. PCT/US2008/073903 mailed on Mar. 19, 2009, 12 pgs.
Lee, "Windows Server 2008", available at least as early as Sep. 27, 2007, at <<http://download.microsoft.com/documents/uk/technet/downloads/technetmagazine/14_18_longhorn_desfin.pdf>>, pp. 14-18.
"Terminal Services Session Broker (TS Session Broker)", at <<http://technet2.microsoft.com/windowsserver2008/en/library/902a6081-9ecd-45ec-96ee-f51097d71c8c1033.mspx?mfr=true>>, Microsoft Corporation, 2007, pp. 3.
Yucel, et al., "Event Aggregation and Distribution in Web-Based Management Systems", available at least as early as Sep 27, 2007, at <<http://citeseer.ist.psu.edu/cache/papers/cs/15626/http:zSzzSzwww.anerousis.comzSznikoszSzpaperszSzYUC99.pdf/event-aggregation-and-distribution.pdf>>, pp. 15.

* cited by examiner

*Primary Examiner* — Patrice Winder
*Assistant Examiner* — Ebrahim Golabbakhsh
(74) *Attorney, Agent, or Firm* — Lee & Hayes, PLLC

(57) ABSTRACT

Described are techniques for providing an application program interface that leverages the terminal services session broker infrastructure to support third party plug-in applications. In a typical scenario, when a user requests for a connection to access third party plug-in applications, the application program interface may override the session broker logic and interacts with the session broker process to identify sessions or suitable servers to which the user can be connected. The user may access the third party plug-in applications through the identified sessions or suitable servers.

25 Claims, 6 Drawing Sheets

SESSION BROKER EXTENSIBILITY APPLICATION PROGRAM INTERFACE

BACKGROUND

In remote access system environment, such as a Terminal Services™ (TS) system, several server computers can host and make available one or more applications to several client devices, which access the applications over a network. In general, a user can remotely access applications hosted by a server computer by establishing a connection between the server computer on one end and the client device at the user's end. Such a communication creates a session between the user and the server, during which the user can interact and use applications hosted on the server computer as if the applications were present locally on the remote client device.

The remote access system (e.g., TS) environment, however, may not be able to allow users to access third party applications loaded on the server computer. Such third party applications, which may also be "plug-in" applications, may be created or provided by independent software vendors (ISVs). Typically, an ISV may not provide a user the routing behavior (process) through which the user is enabled to access the third party application. Therefore, a need exists for third party applications to be hosted on the remote server computers for access by remote client devices and users.

SUMMARY

This summary is provided to describe concepts related to leveraging a remote access system session broker infrastructure that can support third party plug-in applications. These concepts are further described below in the detailed description. The presented summary is not intended to identify essential features of the claimed subject matter, nor is it intended for use in determining the scope of the claimed subject matter.

In one implementation, a session broker server monitors status and connection of remote clients, and servers having applications (plug-in applications), that may be available to the clients. An extensible application program interface (API) identifies sessions available to the remote clients.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
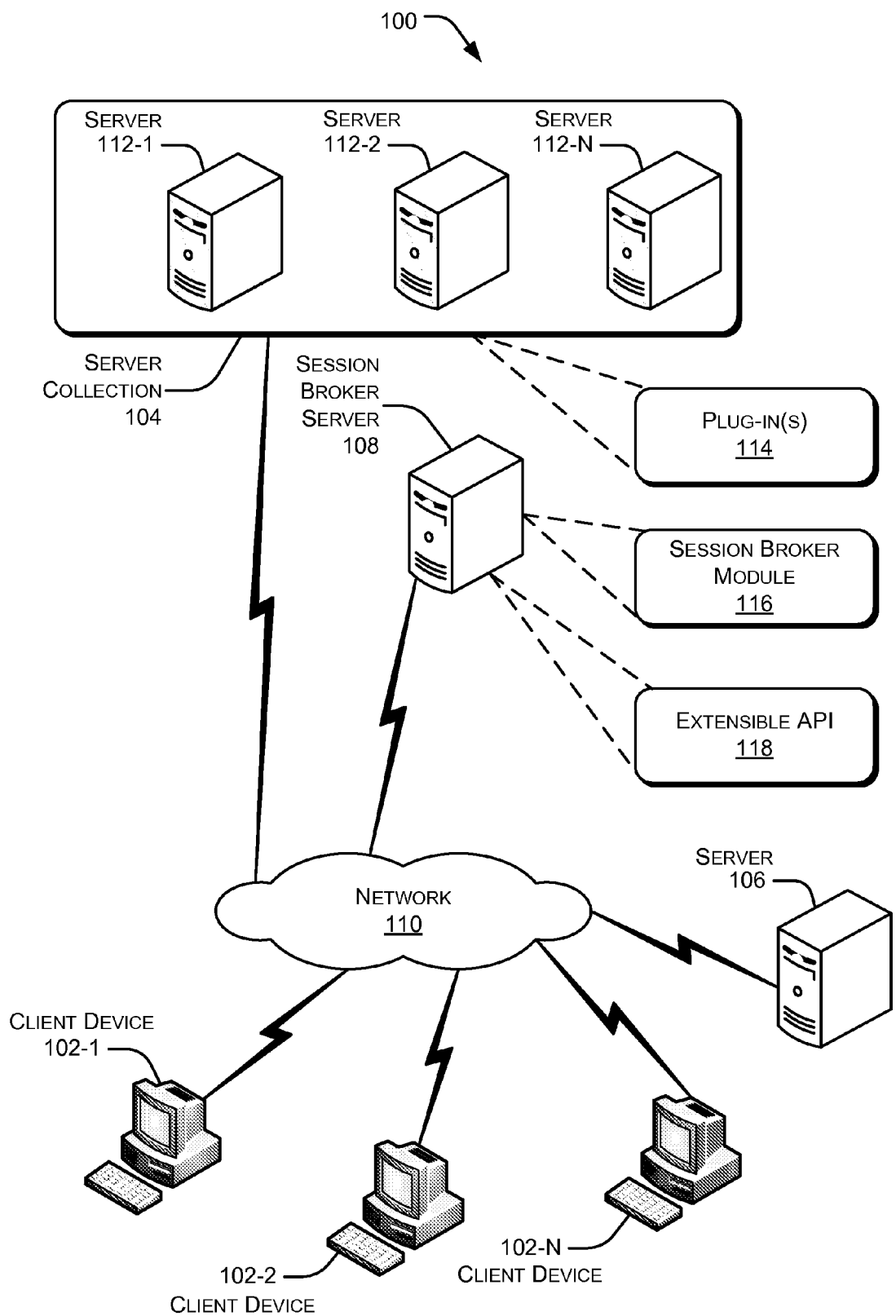
FIG. 1 is a block diagram illustrating an exemplary network architecture for leveraging a remote access system session broker infrastructure to support third party plug-in applications.

This disclosure is directed to techniques for remote access system session broker infrastructure that may support third party plug-in applications. An example of a remote access system is Terminal Services™ systems provided by the Microsoft® Corporation. A Terminal Services™ system is discussed in the examples below; however, it is to be appreciated that the techniques discussed are applicable to other remote access systems.

A session broker controls the allocation of sessions to users communicating in a remote access system environment. A session broker allocates a session to a user based on session state information stored in the session broker. Session state information may include, for example, session IDs, user names, names of the servers where sessions are residing, the number of active sessions in each server computer, and so on.

In a remote access system environment, a server may receive a user request for a connection. The server may initially accept the connection request and then query the session broker to determine where the user can be redirected. The session broker analyzes the session state information of that particular environment and identifies a server to which the user can be redirected. A suitable server may possess a session previously accessed by the user, but later disconnected, to which the user can be reconnected again. In an implementation, a suitable server may provide a new session to which the user can be connected, provided the user does not possess any other existing sessions. The session broker sends information to the requested server enabling the server to establish a connection with the suitable server. For example, the information may include a machine ID, a session ID, and location of the suitable server. The requested server analyzes the information received and redirects the user to the suitable server.

Once the user establishes the connection with the suitable server, the user can access applications present in the suitable server. These applications may be compatible to the session broker logic that was used in identifying the suitable server from the terminal services environment.

A challenge that the remote access system environment faces is to provide users access to third party applications, and particularly plug-in applications. The techniques described herein addresses this challenge by providing an application program interface (API) that leverages the remote access system session broker infrastructure to support third party plug-in applications. In a typical scenario, when a user requests for a connection to access third party plug-in applications, the API may override the session broker logic and interact with the session broker process to identify sessions or suitable servers to which the user can be connected. The user may access the third party plug-in applications through the identified sessions or suitable servers.

In one implementation, the third party plug-in applications may be updated from changes made in the remote access system environment, for example, creation of new sessions, deletion of sessions, configuration changes in servers, connection and disconnection information of sessions, etc. The session broker process may manage the changes in the remote access system environment, and notify the changes to the third party plug-in applications upon receiving instructions from the API.

The techniques described herein may be used in many different operating environments and systems. Multiple and varied implementations are described below. An exemplary environment that is suitable for practicing various implementations is discussed in the following section.

Exemplary systems and methodologies for leveraging a remote access system session broker infrastructure to support third party plug-in applications are described in a general context of computer-executable instructions (program modules) being executed by a computing device, such as a personal computer. Program modules generally include routines, programs, objects, components, data structures, etc., that perform particular tasks or implement particular abstract data types. While the systems and methods are described in the foregoing contexts, acts and operations described hereinafter is implemented in hardware or other forms of computing platforms.

An Exemplary Network Architecture

FIG. 1 shows an exemplary network architecture 100 for leveraging a remote access system session broker infrastructure to support third party plug-in applications. To this end, a network architecture 100 is described that includes a number of client devices 102-1, 102-2, . . . , 102-N (collectively referred to as client devices 102) that may communicate with a server collection 104, a external server or server 106, and a session broker server 108 through a network 110. In one implementation, the server collection 104, the server 106, and the session broker server 108 may interact with numerous personal computers (PCs), web servers, and other computing devices spread throughout the world in the network architecture 100. Alternatively, in another possible implementation, the network architecture 100 can include a limited number of PCs communicating with a single server through a local area network (LAN) or a wide area network (WAN), and the likes.

The network 110 may be a local area network (LAN), a wide area network, a wireless network, an optical network, a metropolitan area network (MAN), etc. The client devices 102 may be a general-purpose computing device, a laptop, a mobile computing device, and so on.

The server collection 104 may include a number of servers 112-1, 112-2, . . . , 112-N (collectively referred to as servers 112). The servers 112 may have plug-in(s) 114 available for the client devices 102. The plug-in (s) 114 may include, for example, third party plug-in applications, and any other software applications. As discussed above, sessions created between the servers 112 and the client devices 102 enable the client devices 102 to access the plug-in(s) 114 hosted in the servers 112. The servers 112 create these sessions based on instructions received from the session broker server 108.

In one implementation, a client device 102-1 may send a request to the server collection 104 to access the plug-in(s) 114 hosted there. A server 112-1 from the server collection 104 accepts the request and establishes a connection with the client device 102-1. The server 112-1 may send a query to the session broker server 108 to determine where to redirect the client device 102-1. It is to be noted that any server 112 from the server collection 104 may accept the connection request from the client device 102-1. In another implementation, the server 112-1 may act as a dedicated redirector and accepts the connection request from the client device 102-1. In such an implementation, the client device 102-1 requesting for a connection may initially connect to the server 112-1.

The session broker server 108 may implement a session broker module 116 and an extensible API 118 to process the query sent by the server 112-1 and identify a session that can be provided to the client device 102-1. The extensible API 118 may be a Distributed Component Object Model (DCOM) based interface that enables several software components distributed across server network computing devices to communicate with each other. In one implementation, the extensible API 118 may be a Component Object Model (COM) based interface that enable communication between various software components in a network environment.

In one implementation, the session broker module 116 may receive the query and notify the extensible API 118 of the receipt of the query. The extensible API 118 generates a function call that may trigger the session broker module 116 to identify the session. The identified session may be an existing session that was earlier associated with the client device 102-1.

The session broker module 116 may then instruct the server 112-1 to redirect the client device 102-1 to any one of the servers 112, for example, the server 112-2, having an existing session. In this instance, the server 112-1 redirects the client device 102-1 to establish a connection with the server 112-2. In another implementation, the session broker module 116 may also redirect the client device 102-1 to the server 108 having an existing session, located outside the server collection 104.

In yet another implementation, the session broker module 116 may identify any suitable server 112 having a new session that can be provided to the client device 102-1, which may not have any existing session in the remote access system environment. The session broker module 116 then instructs the server 112-1 to redirect the client device 102-1 to a suitable server out of the servers 112. In yet another implementation, the session broker module 116 may identify the server 108 as capable of providing the new session to the client device 102-1.

Exemplary System Architecture

Figure 2:
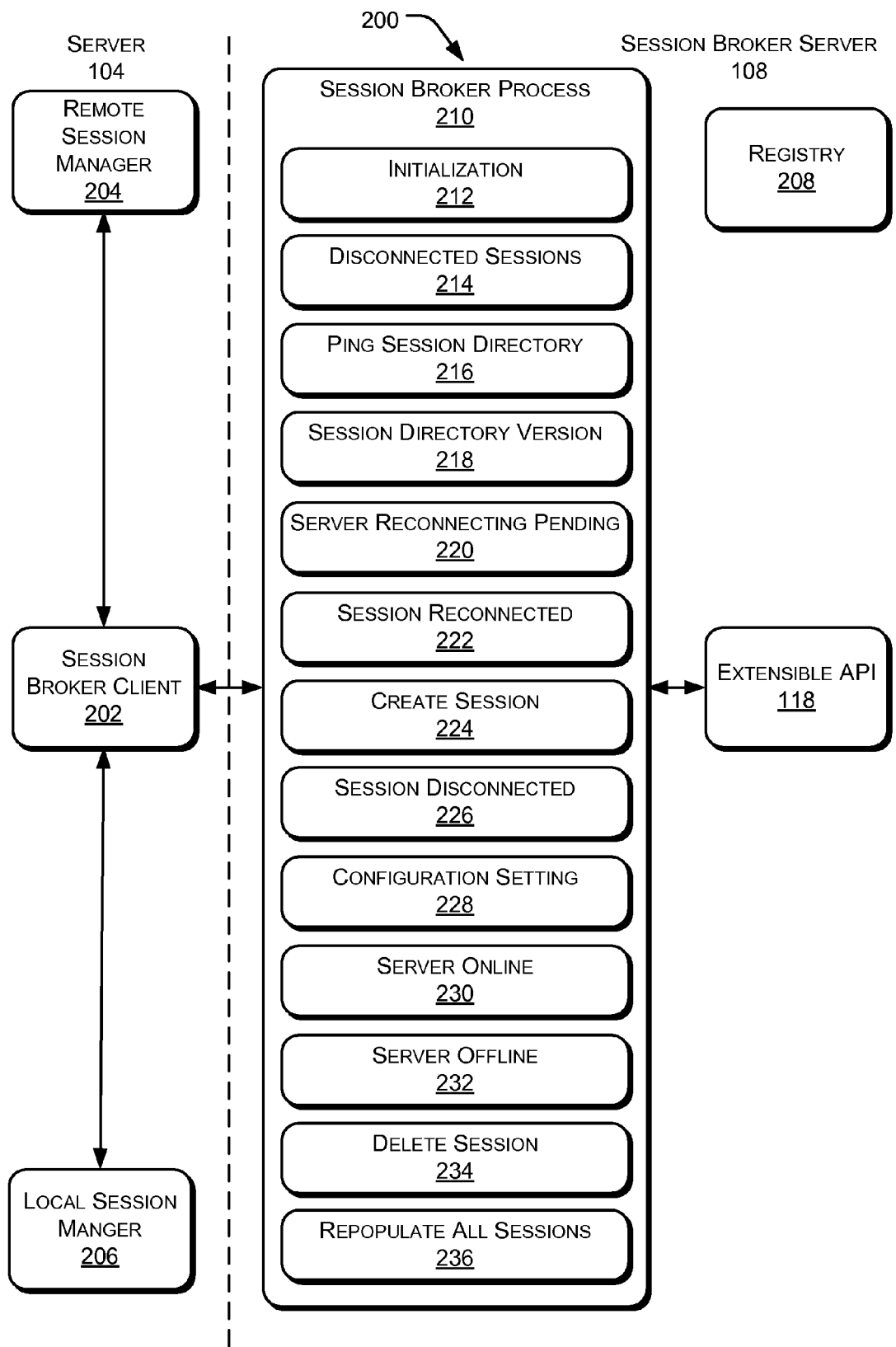
FIG. 2 is a block diagram illustrating an exemplary architecture for leveraging a remote access system session broker infrastructure to support third party plug-in applications.

FIG. 2 shows an exemplary system architecture 200 for leveraging a remote access system session broker infrastructure to support third party plug-in applications. The system architecture 200 illustrates interactions between one of the server from the server collection 106, for example, server 112-1, and the session broker server 108. The server 112-1 may include a session broker client 202 that interacts with a remote connection manager 204 and a local session manager 206. It is to be noted that the servers 112 in the server collection 104 may include their respective session broker client, remote connection manager, and local session manager. The session broker server 108 may further include the session broker module 116 interacting with a registry 208 and the extensible API 118.

The server 112-1 initially connects with a client device 102-1 and receives a request from the client device 102-1 for connection to a session. The session broker client 202 collects the request along with client information. The client information may include, for example, machine ID and location of the client devices 102 in the remote access system environment. The session broker client 202 sends both the request and the client information to the session broker module 116. The session broker module 116 may perform various functions shown as a part of a session broker process 208 to identify a server out of the servers 112 to which the client device 102-1 can be redirected.

In operation, the session broker module 116 may inform the extensible API 118 about the receipt of the request. In one implementation, the session broker module 116 may perform a function, namely initialization 212 to initialize the plug-in (s) 114. During the process of initialization 212, the session broker module 116 determines a class ID of the plug-in(s) 114 from the registry 208. The registry 208 may include, for example, class IDs of various plug-in applications, information about settings of hardware, operating system, non-operating system, client devices, servers, and so on. Pursuant to identifying the class IDs of the plug-in(s) 114, the session broker module 116 may create an instance for the plug-in(s) 114, which in turn initialize the plug-in(s) 114.

Once an instance is created, the extensible API 118 may trigger the session broker module 116 to initiate a function call 'TSSDRpcGetUserDisconnectedSessions', depicted as disconnected session 214, to identify the session to which the client device 102-1 can be redirected. In one implementation, disconnected session 214 may determine an existing session to which the client device 102-1 was connected previously, but later disconnected. In such a scenario, the session broker module 116 may make function calls, namely 'TSSDRpcPingSD' and 'TSSDRpcQuerySDVersion', to identify an existing session from the session directory and, at the same time determine the version of the session directory. The above function calls may be shown as ping session directory 216 and session directory version 218, respectively. The existing session may be a session associated with any one of the servers 112 in the server collection 104. In another implementation, the existing session may be associated to the server 106 located external to the server collection 104.

Upon identifying an existing session, the session broker module 116 may collect session details, for example, session ID, machine ID, and location related to the server that may provide the existing session (e.g., server 112-1). For example, the session broker module 116 may then send the session details along with instructions to establish a connection to the remote connection manager 204. The remote connection manager 204 identifies the server 112-2 out of the servers 112 based on the session details, and redirects the client device 102-1 to the server 112-2 to establish a connection. During the process of redirecting the client device 102-1, the remote connection manager 204 may send a request for a connection to the server 112-2.

The session broker module 116 continuously monitors the status of the connection and updates the extensible API 118 of any changes that occur in the remote access system environment. During the monitoring process, the session broker module 116 may make a function call (i.e., 'TSSDRpcSetServerReconnectPending'), shown as server reconnection pending 220, to inform the extensible API 118 that a request for connection with the server 112-2 is pending.

Once the connection is established, the session broker module 116 may report the connection status to the extensible API 118. For example, the session broker module 116 may make a function call 'TSSDRpcSetSessionReconnected', shown as session reconnected 222, to confirm the extensible API 118 that the client device 102-1 is connected.

The extensible API 118 may initiate the session broker module 116 to generate another function call (i.e., disconnected session 214), to identify a new session that can be provided to the client device 102-1. In such a case, the session broker module 116 collects server details associated with the server, that may be either from the server collection 104 for example, server 112-2 or the external server 106, and sends the server details to the remote connection manager 204. The remote connection manager 204 directs the client device 102-1 to create a new session with the server 112-2 or the server 106. In an implementation, the session broker module 116 confirms whether a new session is created and accordingly initiates a function call, namely 'TSSDRpcCreateSession' depicted as create session 224, to inform the plug-in(s) 114 about the creation of the new session.

In the above implementations, the extensible API 118 may randomly but continuously initiate the session broker module 116 to make a function call (i.e., 'TSSDRpcSetSessionDisconnected'), depicted as session disconnected 226, to inform the plug-in(s) 114 that the session connecting the client device 102-1 and the server 112-2 or the server 106 is disconnected. In such a situation, the session broker module 116 may instruct a local session manager to monitor the disconnected session.

In addition to the above, the extensible API 118 may trigger the session broker module 116 to provide information regarding configuration changes made in the remote access system environment. In such a scenario, the session broker module 116 may initiate a function call (i.e., 'TSSDRpcUpdateConfigurationSetting') shown as configuration setting 228, that may collect information related to configuration changes and reports the changes, if any, to the plug-ins 114.

The extensible API 118 may instruct the session broker module 116 to identify the status of the server 112-2 or server 108 connected to the client device 102-1. The session broker module 116, after receiving instructions, may make function calls, namely 'TSSDRpcServerOnlineEx', and 'TSSDRpcServerOffline', respectively shown as server online 230 and server offline 232, to inform the plug-in 114 whether the server 112-2 or server 108 is offline.

The extensible API 118 may interact with the session broker module 118 to determine the status of various sessions running at a specific time in the remote access system environment. In such an implementation, the session broker module 118 may initiate a function call, for example 'TSSDRpcDeleteSession', shown as delete session 234 to inform the plug-in(s) 114 that the session is deleted. The session broker module 118 may initiate a function call, namely 'TSSDRpcRepopulateAllSession' shown as repopulate all sessions 236, to check status of all the sessions managed by the session broker module 118.

Exemplary Session Broker Server

Figure 3:
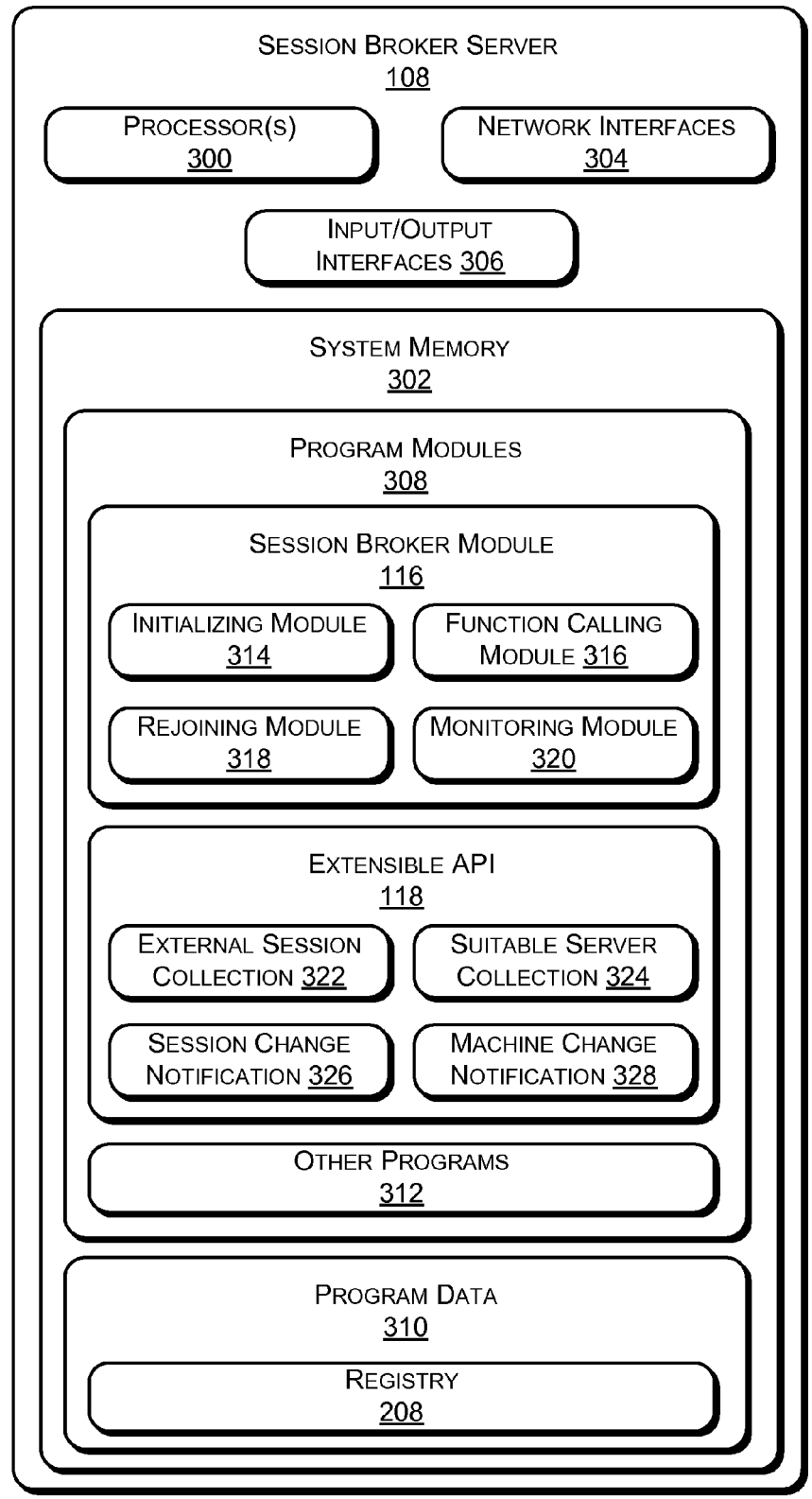
FIG. 3 is a block diagram illustrating an exemplary server system for leveraging a remote access system session broker infrastructure to support third party plug-in applications.

FIG. 3 describes certain functional aspects of session broker server 108 associated with leveraging a remote access system session broker infrastructure to support third party plug-in applications in detail. The server 108 includes processor(s) 300 and a system memory 302. The server 108 further includes network interfaces 304 to provide connectivity to a wide variety of networks, such as the network 102 described in the FIG. 1, and protocol types such as wired (e.g., LAN, cable, etc.) and wireless networks (e.g., WLAN, cellular, satellite, etc.). Input/output interfaces 306 provide data input and output capabilities for the server 108. The input/output interfaces 306 may include, for example, a mouse port, a keyboard port, etc.

The system memory 302 stores program modules 308 and program data 310. The program modules 308 may include the session broker module 116, an extensible API 118, and other application program modules 312 (e.g., an Operating System (OS) to provide a runtime environment, networked communications between multiple users).

The session broker module 116 has several responsibilities including acting as a central unit to the remote access system environment, allocating sessions to the client devices 102 requesting for connection, and monitoring the sessions in the remote access system environment. The session broker module 116 may include an initializing module 314, a function calling module 316, a monitoring module 318, and a rejoining module 320.

As discussed above, the session broker module 116 may be employed to receive a request for a session sent by the client device 102-1 through the server 112-1. Based on the request received, the initializing module 314 initializes the extensible API 118. The initializing module 314 may determine a class ID of the plug-in(s) 114 from the registry 208. Once the class ID of the plug-in(s) 114 matches with the class ID as stored in the registry, the initializing module 314 may create an instance to initialize the extensible API 118.

The extensible API 118 instructs the session broker module 116 to generate appropriate function calls as discussed previously to identify the session to which the client device 102-1 can be redirected. Therefore, a function call, for example 'WTSSBX_GetUserExternalSession' shown as external session collection 322, is called to identify external sessions present in the remote access system environment. The external session may be sessions provided by the server 106 located outside the server collection 104. In such a case, the external session collection 322 may trigger the function calling module 316 to generate a function call such as disconnected session 214 to determine whether the server 106 can offer an external session to the client device 102-1 and also collect the session details if connected externally. Thereafter, the session broker module 116 may collect the session details and direct the client device 102-1 to the server 106 through the server 112-1.

The function call made by the function calling module 316 may be monitored by the monitoring module 318 to determine whether the function call is pending beyond a predefined time. The predefined time may be preset by a user, such as an administrator. In case the function call remains pending beyond the predefined time, the monitoring module 318 may instruct the session broker module 116 to log an error message, if the plug-in(s) 114 fails. Thereafter, the session broker module 116 may initiate the extensible API 118 again.

In one implementation, the external session collection 322 may trigger the function calling module 316 to generate a function call to determine an existing session associated with the client device 104 from the remote access system environment. The function calling module 316, in turn generates function calls, such as ping session directory 216 and session directory version 218, to identify an existing session of the client device 102-1 from the session directory. The function calling module 316 may identify any one of the servers 112 in the server collection 104, for example server 112-2 capable of providing an existing session. In such a scenario, the function calling module 316 collects server details of the server 112-2 and provides their server details to the session broker module 116. Based on the server details, the session broker module 116 may direct the client device 102-1 to the server 112. In another implementation, the existing session may be provided by the server 106 located external to the server collection 104.

The extensible API 114 may initiate the function calling module 316 to make a function call, namely suitable server collection 324 to identify a suitable server from the server collection 104 or external server 106, that can provide a new session to the client device 102-1. For example, the function calling module 316 may make a function call namely, 'WTSSBX_GetMostSuitableServer' to identify the suitable server that can provide a new session to the client device 102-1. Therefore, the function calling module 316 collects server details associated with a suitable server that looks suitable for connection and enables the session broker module 116 to instruct the server 112-1 to establish a connection between the client device 104 and the suitable server.

The function call as discussed above may be monitored by the monitoring module 318 to determine whether the function call is pending beyond a predefined time. In case the function call remains pending beyond the predefined time, the monitoring module 318 may instruct the session broker module 116 to log an error message, if the plug-in(s) 114 fails. Thereafter, the monitoring module 318 redirects the extensible API 118 to interact with a load balancing algorithm of the session broker module 116. The load balancing algorithm enables the session broker module 116 to identify a list of suitable servers. The session broker module 116 identifies a suitable server having the least number of sessions and instructs the server 112-1 to redirect the client device 102-1 to the suitable server.

In the above implementations, the extensible API 118 may be configured to make a call session change notification 326 that triggers the session broker module 116 to update the plug-in(s) 114 about changes occurring in the sessions. For example, the extensible API 118 may make a function call, namely 'WTSSBX_SessionChangeNotification', to enable the session broker module 116 to collect information about any changes occurring in the sessions, such as creation of new sessions, disconnection of existing sessions, reconnection of sessions, and deletion of sessions.

In one implementation, when the function call namely, 'WTSSBX_SessionChangeNotification' remains pending more than the predefined time and plug-in(s) 114 fails, an error event is logged.

In addition, the extensible API 118 may make a call 'WTSSBX_MachineChangeNotification', shown as machine change notification 328, to initiate the session broker module 116 to gather information and then report about changes occurring in the servers 112 and external server 106 in the remote access system environment to the plug-in(s) 114. The changes that occur may include, configuration changes in the servers, and changes in status of the servers (i.e., online or offline status of the servers). In an implementation, when a function call 'WTSSBX_MachineChangeNotification' remains pending for more than a predefined time and the plug-in(s) 114 fail, an error event is logged.

Exemplary Methods

Exemplary processes for leveraging a remote access system session broker infrastructure to support third party plug-in applications are described with reference to FIGS. 1-3. These processes may be described in the general context of computer executable instructions. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

Figure 4:
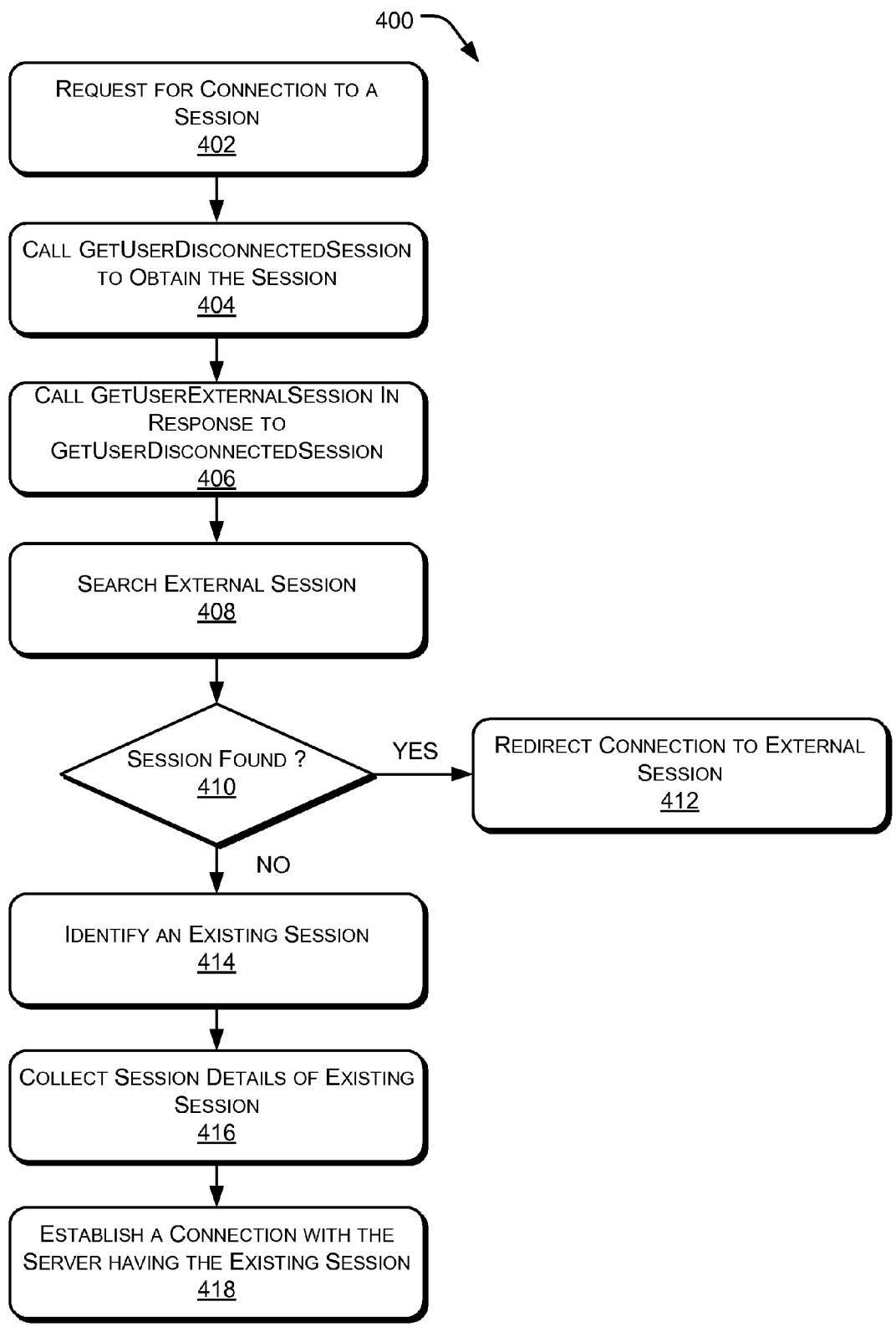
FIG. 4 is a flow chart illustrating an exemplary method for leveraging a remote access system session broker infrastructure to support third party plug-in applications.

FIG. 4 illustrates an exemplary method 400 for leveraging a remote access system session broker infrastructure to support third party plug-in applications. The process 400 is illustrated as a collection of blocks in a logical flow graph, which represents a sequence of operations that can be implemented in a hardware, software, or a combination thereof. In the context of software, the blocks represent computer instructions that, when executed by one or more processors, perform the recited operations.

The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method can be implemented in any suitable hardware, software, firmware, or a combination thereof, without departing from the scope of the invention.

At block 402, a user requests for a connection to a session. In one implementation, user of the client device 102-1 makes a request to the server 112-1 for a session in order to access the plug-in(s) 114 or any other applications hosted on the servers. The session broker module 116 receives the request for a session from the server 112-1, that is initially connected with the client device 102-1. Thereafter, the session broker module 116 initializes the extensible API 118 associated with the plug-in(s) 114.

At block 404, a function call, i.e., 'GetUserDisconnectedSession', is called to obtain a session. In one implementation, the server 112-1 acting a redirector for the client device 102-1 makes the function call to the session broker server 108. The session broker module 116 of the session broker server 108 receives the function call and informs the extensible API of the function call.

At block 406, a function call, namely 'GetUserExternalSession', is made in response to the call 'GetUserDisconnectedSession'. The session broker module 116 may send the server function call made by the server 112-1 to the extensible API 118. The extensible API 118, upon receipt of this server function call, may make a function call 'GetUserExternalSession' to identify a session for the client device 102-1.

At block 408, an external session for the user of the client device is searched. A function call 'GetUserExternalSession' initiated by the extensible API 118 may trigger the session broker module 116 to identify a user external session present in the remote access system environment.

At block 410, a determination is made whether the external session is present or not. If an external session is present (i.e., the "YES" path from block 410), the client device 102-1 is redirected to the server 106 to establish the external session. If there are no external sessions present in the remote access system environment (i.e., the "NO" path from block 410), an existing session associated with the client device 102-1 is identified at block 414.

At block 416, after an existing session is identified, session details of that existing session is collected. Such session details may be stored in the session directory stored in the session broker server 108.

At block 418, a connection with the server having an existing session is established. The session broker module 116 may send instructions along with the session details of the suitable server having an existing session to the server 112-1 configured to redirect the client device 102-1. The server 112-1 identifies the suitable server based on the session details and redirects the client device 102-1 to the suitable server to establish a connection.

Figure 5:
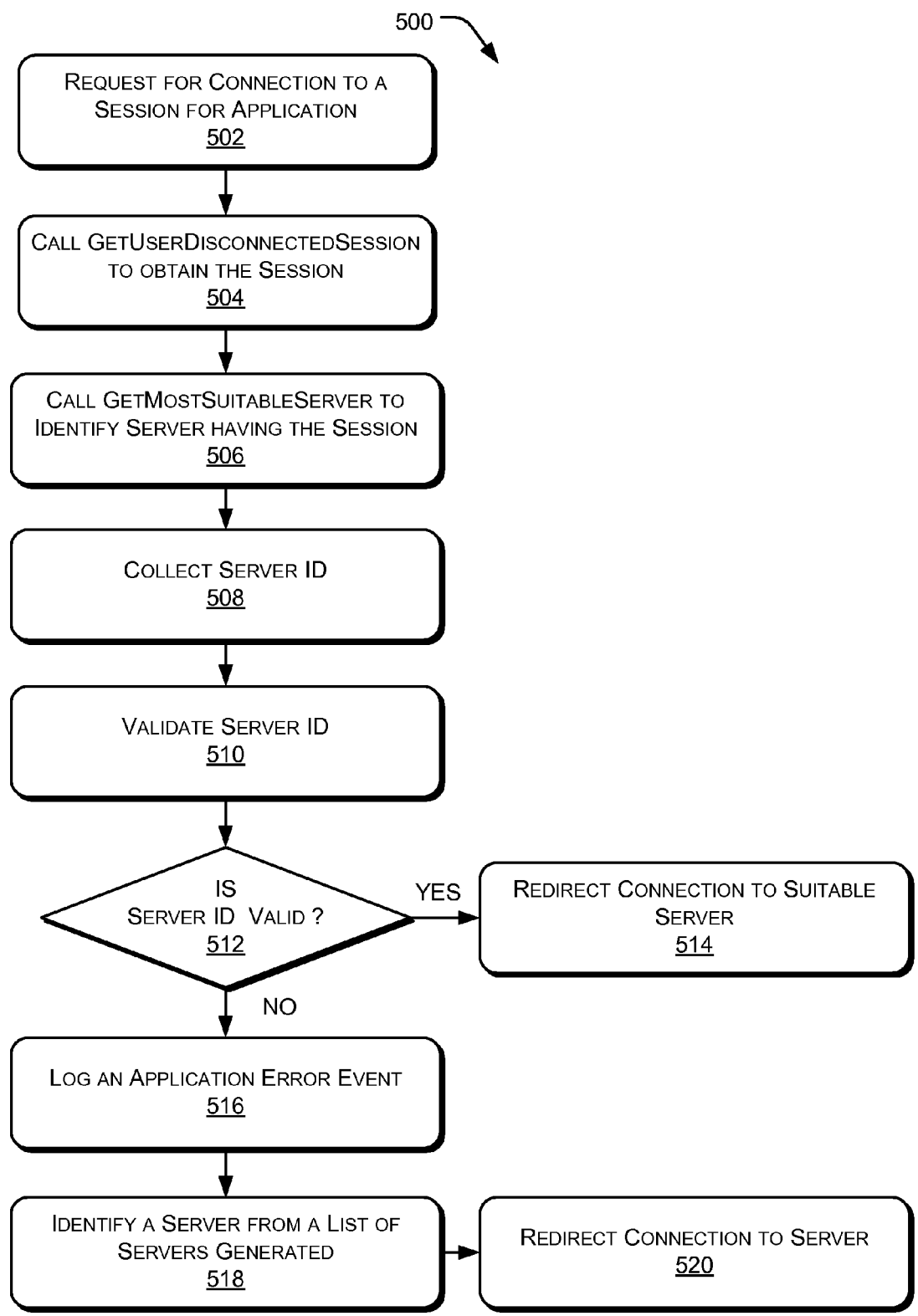
FIG. 5 is a flow chart illustrating another exemplary method for leveraging a remote access system session broker infrastructure to support third party plug-in applications.

FIG. 5 illustrates another exemplary method 500 for leveraging a remote access system session broker infrastructure to support third party plug-in applications. At block 502, a request for a connection to a session is made. The session broker module 116 may receive a request for a session through a server, say the server 112-1, that is initially connected with the client device 102-1. Thereafter, the session broker module 116 initializes the extensible API 118 associated with the plug-in(s) 114.

At block 504, a function call 'GetUserDisconnectedSession' is made to obtain a session. In one implementation, the server 112-1 acting as a redirector for the client device 102-1 may make the function call to the session broker server 108. The session broker module 116 of the session broker server 108 receives the function call and informs the extensible API 118 of the function call.

At block 506, a function call 'GetUserExternalSession' is made in response to a call 'GetMostSuitableServer'. The session broker module 116 may send the server function call made by the redirecting server 112-1 to the extensible API 118. The extensible API 118 upon receipt of this server function call may call the function call 'GetMostSuitableServer' that may initiate the session broker module 116 to identify a suitable server, for example, any server out of the servers 112 or the external server 106, to which the client device 102-1 can be redirected.

At block 508, the server ID associated with the suitable server is collected. The session broker module 116 gathers the server ID of the suitable server in the remote access system environment.

At block 510, the server ID of the suitable server is validated. In one implementation, the session broker module 116 may check the registry 208 to identify whether the server ID is present in the registry 208 or not and also checks whether the server ID relates to the suitable server.

In another implementation, the session broker module 116 may determine whether the suitable server having the server ID is in drain mode or not. If the suitable server is in drain mode, the suitable server may deny any new remote logon from other users. Further, in such a condition, the users in the remote access system environment having existing session with the servers may be reconnected. In yet another implementation, the session broker module 116 may check whether the suitable server having the desired server ID has crossed the maximum number of sessions allocated to suitable server.

At block 512, a determination is made whether the server ID is valid or not. If the server ID is valid (i.e., the "YES" path from block 512), the client device 102-1 is redirected to establish a connection with the suitable server at block 514. If the server ID is not valid (i.e., the "NO" path from block 512), a plug-in error event is logged. For example, a warning is logged when the function call 'WTSSBX_GetMostSuitableServer' called by the extensible API 118 returns an invalid server ID.

In another scenario, if the function call 'WTSSBX_GetMostSuitableServer' redirects the client device 102-1 to the suitable server in drain mode, the plug-in error event is logged as a warning. Similarly in yet another scenario, a plug-in error event is logged when the function call 'WTSSBX_GetMostSuitableServer' provides the suitable server that has violated a predefined session limit.

At block 518, a suitable server is identified from a list of servers having their corresponding weights. The session broker module 116 may employ a load balancing algorithm to assign weights to each server in the remote access system environment based on the number of sessions handled by each server. The session broker module 116 generates a list of servers and identifies a suitable server from the list. The server identified may posses a lesser number of sessions and thus shows the capability of providing a session to the client device 102-1.

At block 520, the client device 102-1 is redirected to establish a connection with the identified server.

An Exemplary Computer Environment

Figure 6:
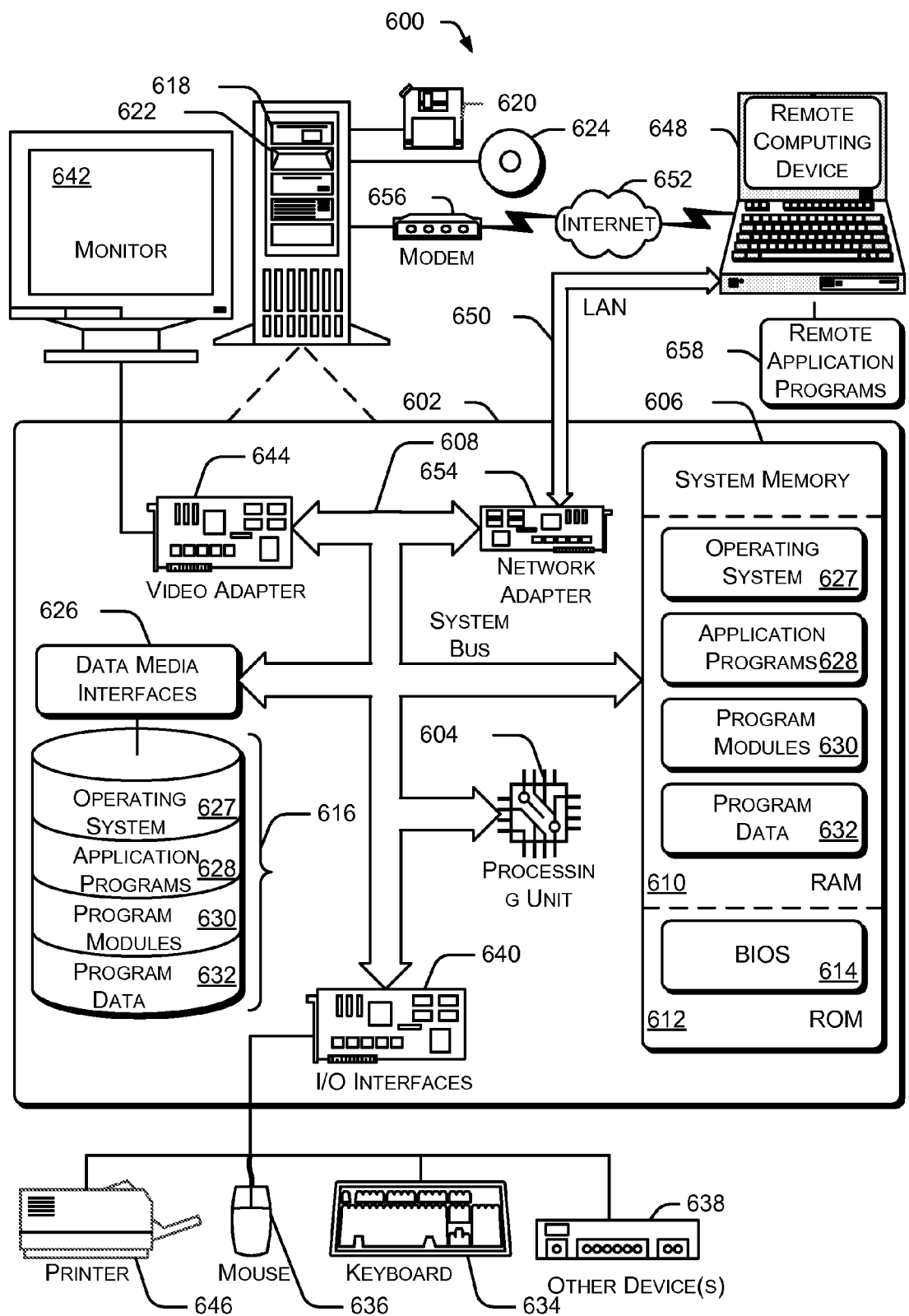
FIG. 6 is a block diagram illustrating illustrates an exemplary computing environment.

FIG. 6 illustrates an exemplary general computer environment 600, which can be used to implement the techniques described herein, and which may be representative, in whole or in part, of elements described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing-based device in the form of a computer 602. Computer 602 can be, for example, a desktop computer, a handheld computer, a notebook or laptop computer, a server computer, a game console, and so on. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, also known as a Mezzanine bus.

Computer 602 typically includes a variety of computer readable media. Such media can be any available media that is accessible by computer 602 and includes both volatile and non-volatile media, and removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in a ROM 612 is illustrated. A RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown). Furthermore, FIG. 6 illustrates a magnetic disk drive 618 for reading from and writing to a removable, non-volatile magnetic disk 620 (e.g., a "floppy disk"). Moreover, FIG. 6 illustrates an optical disk drive 622 for reading from and/or writing to a removable, non-volatile optical disk 624, such as a CD-ROM, DVD-ROM, or other optical media. The hard disk drive 616, the magnetic disk drive 618, and the optical disk drive 622 are all connected to the system bus 608 by one or more data media interfaces 626. Alternately, the hard disk drive 616, the magnetic disk drive 618, and the optical disk drive 622 can be connected to the system bus 608 by one or more interfaces (not shown).

The disk drives and their associated computer-readable media provide non-volatile storage for computer readable instructions, data structures, program modules, and other data of the computer 602. Although, the example illustrates the hard disk 616, the removable magnetic disk 620, and the removable optical disk 624, it is to be appreciated that other types of computer readable media which can store data that is accessible by computers, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like can also be utilized to implement the exemplary computing system and environment.

Any number of program modules can be stored on the hard disk 616, the magnetic disk 620, the optical disk 624, the ROM 612, and/or the RAM 610, including by way of example, an operating system 626, one or more applications 628, other program modules 630, and program data 632. Each of such operating system 626, one or more applications 628, other program modules 630, and program data 632 (or some combination thereof) may implement all or part of the resident components that support a distributed file system.

A user can enter commands and information into the computer 602 via input devices, such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures also, such as a parallel port, game port, or a universal serial bus (USB).

A monitor 642 or other type of display device can also be connected to the system bus 608 via an interface, such as a video adapter 644. In addition to the monitor 642, other output peripheral devices can include components, such as speakers (not shown) and a printer 646, which can be connected to the computer 602 via the input/output interfaces 640.

The computer 602 can operate in a networked environment using logical connections connecting to one or more remote computers, such as a remote computing-based device 648. By way of examples, the remote computing-based device 648 can be a personal computer, portable computer, a server, a router, a network computer, a peer device or other common network node, and the like. The remote computing-based device 648 is illustrated as a portable computer that can include many or all of the elements and features described herein relative to the computer 602.

Logical connections between the computer 602 and the remote computer 648 are depicted as a local area network (LAN) 650 and also through a general wide area network (WAN) 652. Such networking environments are commonplace in offices, enterprise-wide computer networks, intranets, and the Internet.

When implemented in a LAN networking environment, the computer 602 is connected to a local network 650 via a network interface or an adapter 654. When implemented in a WAN networking environment, the computer 602 typically includes a modem 656 or a similar means for establishing communications over the wide network 652. The modem 656, which can be internal or external to the computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with the computing environment 600, the program modules depicted relative to the computer 602, or portions thereof, may be stored in a remote memory storage device. By way of examples, remote applications 658 reside on a memory device of the remote computer 648. For purposes of illustration, applications and other executable program components, such as the operating system, are illustrated herein as discrete blocks, although it is recognized that such programs and components reside in various times at different storage components of the computing-based device 602, and are executed by the data processor(s) of the computer 602.

Various modules and techniques may be described herein in the general context of computer-executable instructions, such as program modules, executed by one or more computers or other devices. Generally, program modules include routines, programs, objects, components, data structures, etc., that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in a hardware or a combination of hardware, software, and/or a firmware. For example, one or more application specific integrated circuits (ASICs) or programmable logic devices (PLDs) could be designed or programmed to implement one or more portions of the framework.

CONCLUSION

Although embodiments for leveraging the terminal services session broker infrastructure to support third party plug-in applications have been described in language specific to structural features and/or methods, it is to be understood that the subject of the appended claims is not necessarily limited to the specific features or methods described. Rather, the specific features and methods are disclosed as exemplary implementations for leveraging the terminal services session broker infrastructure to support third party plug-in applications.

What is claimed is:

1. A server comprising:
    a memory;
    one or more processors operatively coupled to the memory;
    a session broker module in the memory configured to monitor status and connection of remote clients; and
    an extensible application program interface (API) in the memory, that identifies sessions available to the remote clients, the API configured for:
        extensibility by addition of a software plug-in;
        overriding, according to the software plug-in, logic within the session broker module; and
        interacting, with the session broker module, to enable the session broker module to perform a search for, and identification of, sessions or suitable servers to which the remote clients may be connected, the sessions or suitable servers found including at least one session or server not available through the session broker module prior to the overriding.

2. The server of claim 1, wherein the session broker module receives queries from the remote clients and notifies the API.

3. The server of claim 1, wherein the session broker module directs the remote clients to one of multiple servers.

4. The server of claim 1, wherein the session broker module initializes plug-in applications residing on one or more servers which the remote clients may connect to.

5. The server of claim 1, wherein the session broker module collects and provides the API configuration changes as to remote access system environment that includes the server, the remote clients, and one or more servers.

6. The server of claim 1, wherein the session broker module includes an initializing module that initializes the API, and determines identification of plug-in applications in a registry.

7. The server of claim 1, wherein the session broker module includes a function calling module that generates function calls to determine and collect session information for the remote clients.

8. The server of claim 7, wherein the session broker module includes a monitoring module that determines if the function calls are pending over a predefined time.

9. The server of claim 8, wherein an error message is generated a function call is pending over the predefined time.

10. The server of claim 7, wherein API initiates the function calling module to identify one of multiple servers to one of the remote clients, to provide a session to the one remote client.

11. The server of claim 1, wherein the API is component object model that enables multiple software components across a network that connects the remote clients and server, to communicate with one another.

12. The server of claim 1, wherein the API makes a session change notification that initiates the session broker module to update plug-in applications residing on one or more servers.

13. The server of claim 1, wherein the API makes a call as to machine change notification, initiating the session broker module to gather information and report changes in the server and other servers which the remote clients connect to.

14. A method implemented on a computer executable media comprising:
    receiving requests, at a server, the requests coming from a remote client and received at a session broker module on the server, the session broker module configured to monitor status and connection of the remote client, and configured to receive requests from the remote clients for access to sessions or suitable servers;
    calling a function to obtain the session, the function call being made to an extensible application program interface (API), the API configured for:
        extensibility by operation of a third party software plug-in;
        overriding, as indicated by the software plug-in, logic within the session broker module that would otherwise prevent location of sessions or servers indicated by the software plug-in; and
        enabling the session broker module to perform a search for, and identification of, sessions or suitable servers to which the remote client may be connected, the sessions or suitable servers found including at least one session or server not available through the session broker module prior to the overriding;
    identifying any pre-existing sessions of the client;
    searching for an external session for a user of the client; and
    establishing a connection with a server for the remote client.

15. The method of claim 14 further comprising determining if the external session or another external session is present.

16. The method of claim 15 further comprising collecting session details of an identified external session.

17. The method of claim 15 further comprising connecting to an existing session.

18. The method of claim 14 further comprising identifying a suitable server for the user.

19. The method of claim 18 further comprising collecting an identification of the suitable server.

20. The method of claim 19 further comprising validating the identification.

21. The method of claim 20, wherein an error event for a plug-in application is recorded if the identification is not validated.

22. The method of claim 18 further comprising logging a plug-in error event if the suitable server is in drain mode.

23. The method of claim 18 further comprising identifying the suitable server from a list of servers having load balancing weights.

24. The method of claim 18 further comprising generating a list of servers for the suitable server.

25. A method implemented on a computer executable media comprising:

receiving a request, coming from a remote client, the request received at a session broker module on a server;

calling an extensible application program interface (API), the extensible API configured for:

extensibility by incorporation of a software plug-in;

overriding logic within the session broker module, the overriding performed according to the software plug-in, the overriding allowing location of sessions or servers indicated as indicated by the software plug-in; and enabling the session broker module to perform a search for, and identification of, sessions or suitable servers to which the remote client may be connected, the sessions or suitable servers found including at least one session or server not available through the session broker module prior to the overriding; and establishing a session for the remote client with a server not available through the session broker module prior to the overriding.

* * * * *